(12) United States Patent
Sorek et al.

(10) Patent No.: US 8,103,134 B2
(45) Date of Patent: Jan. 24, 2012

(54) METHOD AND A HANDHELD DEVICE FOR CAPTURING MOTION

(75) Inventors: Noam Sorek, Zikhron-Yaakov (IL); Eduard Oks, Bat-Yam (IL); Chulhwan Lee, Seoul (KR); Asaf Barzilay, Tel-Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1008 days.

(21) Appl. No.: 12/071,359

(22) Filed: Feb. 20, 2008

(65) Prior Publication Data

US 2009/0208062 A1 Aug. 20, 2009

(51) Int. Cl.
*G06K 9/22* (2006.01)
*G06K 9/00* (2006.01)
*H04N 5/225* (2006.01)

(52) U.S. Cl. .................. 382/313; 382/107; 348/169

(58) Field of Classification Search .................. 382/103, 382/106, 107, 173, 250, 284, 298, 299, 305, 382/312, 313; 348/36, 154, 169, 208.14, 348/208.15; 345/204, 473, 629, 650; 353/13, 353/30; 358/1.2
See application file for complete search history.

(56) References Cited

U.S. PATENT DOCUMENTS

| | | | | |
|---|---|---|---|---|
| 6,164,973 A | * | 12/2000 | Macri et al. | 434/247 |
| 6,393,163 B1 | * | 5/2002 | Burt et al. | 382/294 |
| 6,567,116 B1 | * | 5/2003 | Aman et al. | 348/169 |
| 6,707,487 B1 | * | 3/2004 | Aman et al. | 348/169 |
| 6,965,379 B2 | * | 11/2005 | Lee et al. | 345/427 |
| 7,156,519 B2 | * | 1/2007 | Mao et al. | 353/13 |
| 7,675,655 B2 | * | 3/2010 | Marshall et al. | 358/486 |

OTHER PUBLICATIONS

Pritch et al "Video Synopsis and Indexing", School Computer Science and Engineering, The Hebrew University of Jerusalem, 91904 Jerusalem, Israel Jul. 19, 2011.
Rav-Acha et al "Makin a Long Video Short: Dynamic Video Synopsis", Proceedings of the 2006 IEEE Computer Society Conference on Computer Vision and Pattern Recognition (CVPR'06).

* cited by examiner

*Primary Examiner* — Kanjibhai Patel

(57) ABSTRACT

A method for creating an image that depicts the motion of a moving object. The method comprises: a) identifying a motion of a moving object in a plurality of initial images depicting a scene, b) capturing a plurality of reference images of the moving object, c) cropping at least one sub-image of the moving object from at least one of the plurality of reference images, and d) combining the at least one sub-image and at least one of the plurality of reference images to produce a final representation depicting the motion. The resolution of the plurality of initial images is lower than the resolution of the plurality of reference images.

30 Claims, 11 Drawing Sheets
(7 of 11 Drawing Sheet(s) Filed in Color)

METHOD AND A HANDHELD DEVICE FOR CAPTURING MOTION

FIELD AND BACKGROUND OF THE INVENTION

The present invention, in some embodiments thereof, relates to an apparatus and a method for capturing an image and, more particularly, but not exclusively, to an apparatus and a method for capturing a digital image that depicts a scene with moving objects.

In recent years, the demand for high performance compact digital imaging devices has increased. Such imaging devices convert an image of an intercepted scene into electronic signals by using an image sensor, such as a charge-coupled device (CCD) based sensor or a complementary metal-oxide semiconductor (CMOS) based sensor. In particular, the demand for high performance compact digital imaging devices, which are designed to be mounted in a compact device, such as a mobile phone, and have image sensors that have large numbers of pixels, for example more than two million pixels, is increasing. Such a demand is an outcome of the prevalence of mobile devices that incorporate digital cameras, such as laptops, webcams, mobile phones, personal digital assistants (PDAs) and the like.

Such imaging devices are usually designed to capture both still images and video sequences. Capturing a video sequence requires more computational complexity than capturing a still image and the memory which is needed to store large amount of input video frames is relatively high. I common technique to avoid the high demand of computational complexity and memory, is to capture and/or store the input video frames in low resolution.

Because of capturing a still image and capturing a video sequence are two different modes of operation, a user desiring to capture both video images and high resolution still images of a scene must switch modes, likely resulting in the shot being missed.

A number of methods have been developed to overcome this problem, for example U.S. Pat. No. 7,148,919, granted on Dec. 12, 2006 discloses an imaging system operable to substantially simultaneously capture still image data and video data. The imaging system includes an optical system capturing incident light representative of an image and an integrated circuit. The integrated circuit includes at least one sensor receiving the incident light and substantially simultaneously generating the still image data and the video data within an exposure window. The imaging system also includes a controller transmitting signals to the integrated circuit for controlling the generation of the still image data and the video data.

Another example is U.S Patent Application No. 2004/0246344, published on Dec. 9, 2004 that discloses a method is disclosed for capturing images, including reading image data in an image sensor from a photodetector array in the image sensor, and processing the image data in the image sensor. The method alternates between processing the image data to generate video frames and to generate portions of still images. A plurality of video frames are processed in the time it takes to process a complete still image. The video frames have a lower resolution than the still images.

SUMMARY OF THE INVENTION

The present invention is related to a method and an apparatus for capturing images of a scene in which one or more objects are in motion and creating a final representation, such as an image or an animated image that clearly depicts the scene and the one or more moving objects.

According to an aspect of some embodiments of the present invention there is provided a method for creating an image depicting a motion of a moving object. The method comprises: a) identifying a motion of a moving object in a plurality of initial images depicting a scene, b) using the motion for capturing a plurality of reference images of the moving object, c) cropping at least one sub-image depicting at least the moving object from at least one of the plurality of reference images, and d) combining the at least one sub-image and at least one of the plurality of reference images to produce a final representation depicting the motion.

Optionally, the resolution of the plurality of initial images is lower than the resolution of the plurality of reference images.

Optionally, the method further comprises identifying the moving object in a plurality of nonoverlapping areas in the plurality of initial images before b), the capturing being performed according to the plurality of nonoverlapping areas.

Optionally, the method further comprises identifying the moving object in a first and a second of the plurality of initial images before b), the capturing being performed according to the first and second initial images, wherein the first and second initial images depicting the moving object in first and second positions, the first and second positions being located in a predefined range from one another.

Optionally, each the initial image is a joint photographic experts group (JPEG) image, wherein the identifying comprises identifying the motion according by comparing discrete cosine transform (DCT) coefficients of former and later of the plurality of initial images.

Optionally, the capturing comprises: capturing a first reference image and identifying boundaries encircling the moving object therein before b), wherein each the reference image depicting the moving object outside of the boundaries.

Optionally, the method further comprises assembling at least two of the plurality of reference images to create a panoramic image before the combining, the combining comprises combining the at least one sub-image and the panoramic image to produce the final representation.

Optionally, the method further comprises displaying to a user an indicator indicative of the motion.

Optionally, the identifying further comprises: calculating a distance between the boundaries of an initial image depicting the moving object and the moving object, and alarming a user if the distance exceeds a predefined distance threshold.

Optionally, the final representation comprises a member of a group comprises a still image, a sequence in which the motion being animated, a still image animated with the motion.

Optionally, the identifying comprises identifying a plurality of motions of a plurality of moving objects in the plurality of initial images, each the reference image depicting the plurality of moving objects, the cropping comprises cropping at least one sub-image of each the moving object from at least one of the plurality of reference images, the final representation depicting the plurality of motions.

More optionally, the resolution of the plurality of initial images is around quarter video graphics array (QVGA) resolution and the resolution of the plurality of reference images in around video graphics array (VGA) resolution.

According to an aspect of some embodiments of the present invention there is provided a handheld device for capturing an image depicting a motion of a moving object. The handheld device comprises an imaging unit configured for capturing a plurality of initial and reference images and a cropping module configured for identifying a motion of a moving object by analyzing the plurality of initial images and for using the motion for cropping at least one sub-image depicting at least the moving object from at least one of the plurality of reference images. The handheld device further comprises a combining module configured for combining the at least one sub-image and at least one of the plurality of reference images to produce a final representation depicting the motion of the moving object. The imaging unit is configured for capturing the reference images according to the motion.

Optionally, the resolution of the plurality of initial images is lower than the resolution of the plurality of reference images.

Optionally, the handheld device is a cellular phone.

According to an aspect of some embodiments of the present invention there is provided a method for creating an image depicting a motion of an object. The method comprises a) displaying a plurality of images to a user, each the image depicts a scene with a moving object, b) cropping at least one sub-image depicting at least the moving object from at least one of the plurality of images according to an instruction received from the user, and c) combining the at least one sub-image and at least one of the plurality of images to produce a final representation depicting the motion of the moving object.

Optionally, the displaying further comprises presenting to a user an indicator indicative of the motion direction of the moving object.

Optionally, each the image having a central area and a peripheral area the displaying further comprises presenting to a user an indicator indicative of the capturing of the moving object in one of the central and peripheral areas.

More optionally, the presenting is a member of a group consisting of: displaying an indicator, activating a tactile alarm, and playing an alarming sound.

Optionally, the displaying further comprises calculating a distance between the boundaries of one of the plurality of images depicting the moving object and the moving object, and alarming the user if the distance exceeds a predefined distance threshold.

More optionally, the alarming is a member of a group consisting of: displaying an indicator, activating a tactile alarm, and playing an alarming sound.

Optionally, the method further comprises identifying the moving object in a plurality of nonoverlapping areas in the plurality of images before b), the cropping being performed according to the plurality of nonoverlapping areas.

Optionally, the method further comprises allowing the user to define the plurality of nonoverlapping areas before b).

Optionally, the scene depicts a plurality of moving objects, further comprises allowing the user to select at least one of the plurality of moving objects before b), the cropping comprises cropping at least one sub-image of the at least one of the plurality of moving objects.

Optionally, the method further comprises assembling at least two of the plurality of images to create a panoramic image before the c), the combining comprises combining the at least one sub-image and the panoramic image to produce the final representation.

Optionally, the final representation comprises a member of a group comprises a still image, a sequence in which the motion being animated, a still image animated with the motion.

Optionally, the plurality of images are captured using a handheld device which is held by the user.

Optionally, the displaying comprises displaying only a portion of the plurality of images to the user, each the portion being selected according to a member selected from a group consisting of: an object motion of the moving object and a camera motion of a camera used for capturing the plurality of images.

According to an aspect of some embodiments of the present invention there is provided a handheld device for capturing an image depicting a motion of an object. The handheld comprises an imaging unit configured for capturing a plurality of images, each the image depicts a scene and a user interface configured for displaying the plurality of images to a user and allowing the user to tag a moving object in the scene. The handheld further comprises a cropping module configured for cropping at least one sub-image depicting at least the moving object from at least one of the plurality of images and a combining module configured for combining the at least one sub-image and at least one of the plurality of images to produce a final representation depicting the motion of the moving object.

Optionally, the handheld device is a cellular phone.

According to an aspect of some embodiments of the present invention there is provided a method of assembling a panoramic image from a plurality of frames. The method comprises: a) identifying an object motion of a moving object in a plurality of images depicting a scene, b) identifying an initial camera motion of a camera capturing the plurality of images, c) adjusting the initial camera motion according to the object motion, and d) using the adjusted initial camera motion for stitching at least two of the plurality of images to create a panoramic image.

Optionally, the method further comprises substantially removing the moving object from the at least two images before d).

Optionally, the method further comprises cropping at least one sub-image depicting the moving object from at least one of the plurality of images and combining the at least one sub-image and the panoramic image to produce a final representation depicting the motion after the d).

Optionally, the method further comprises cropping the panoramic image, the boundaries of the cropped panoramic image being determined according to the depicted position of the moving object in the panoramic image.

Optionally, the method further comprises using the object motion for capturing a plurality of reference images of the moving object after the a), the stitching comprises stitching at least two of the plurality of reference images to create the panoramic image; wherein the resolution of the plurality of images is lower than the resolution of the plurality of reference images.

Optionally, the stitching comprises stitching similar strips in the stitching at least two images, each the similar strip does not depict the moving object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or apparatus of embodiments of the invention can involve performing or completing selected tasks manually, automatically, or a combination thereof. Moreover, according to actual instrumentation and equipment of embodiments of the method and/or apparatus of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or apparatus as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings and images:

FIG. 1 is a schematic illustration of a handheld device for creating a final image depicting a motion of an object in real time, according to one embodiment of the present invention;

FIG. 2 is a flowchart of a method for creating an image that depicts a motion of an object, according to some embodiments of the present invention;

FIG. 3 is a schematic illustration of an exemplary preview sequence, a set of reference images, and a number of exemplary sub-images, according to some embodiments of the present invention;

FIGS. 4A-4C are schematic illustrations of images that depict two moving objects, according to some embodiments of the present invention;

FIG. 5 is an exemplary final image that combines a number of sub-images and a reference image, according to some embodiments of the present invention;

FIG. 6 is a schematic illustration of an exemplary final image that combines a number of sub-images and a reference image, according to some embodiments of the present invention;

FIG. 7 is an exemplary panoramic image that depicts the motion of a moving object, which is captured according to one embodiments of the present invention;

FIG. 8 is a flowchart of a method for creating an image depicting a motion of an object, according to some embodiments of the present invention;

FIG. 9 is a flowchart of a method for creating a panoramic image, according to some embodiments of the present invention;

FIG. 10 is a panoramic image that includes a number of stitched images which is generated according to an embodiment of the present invention;

FIG. 11 is a schematic illustration of an exemplary display of an exemplary handheld device, according to one embodiment of the present invention; and FIG. 12 is a flowchart of a method for generating a final image depicting a motion, optionally substantial motion, of one or more objects, according to some embodiments of the present invention.

Figure 1:
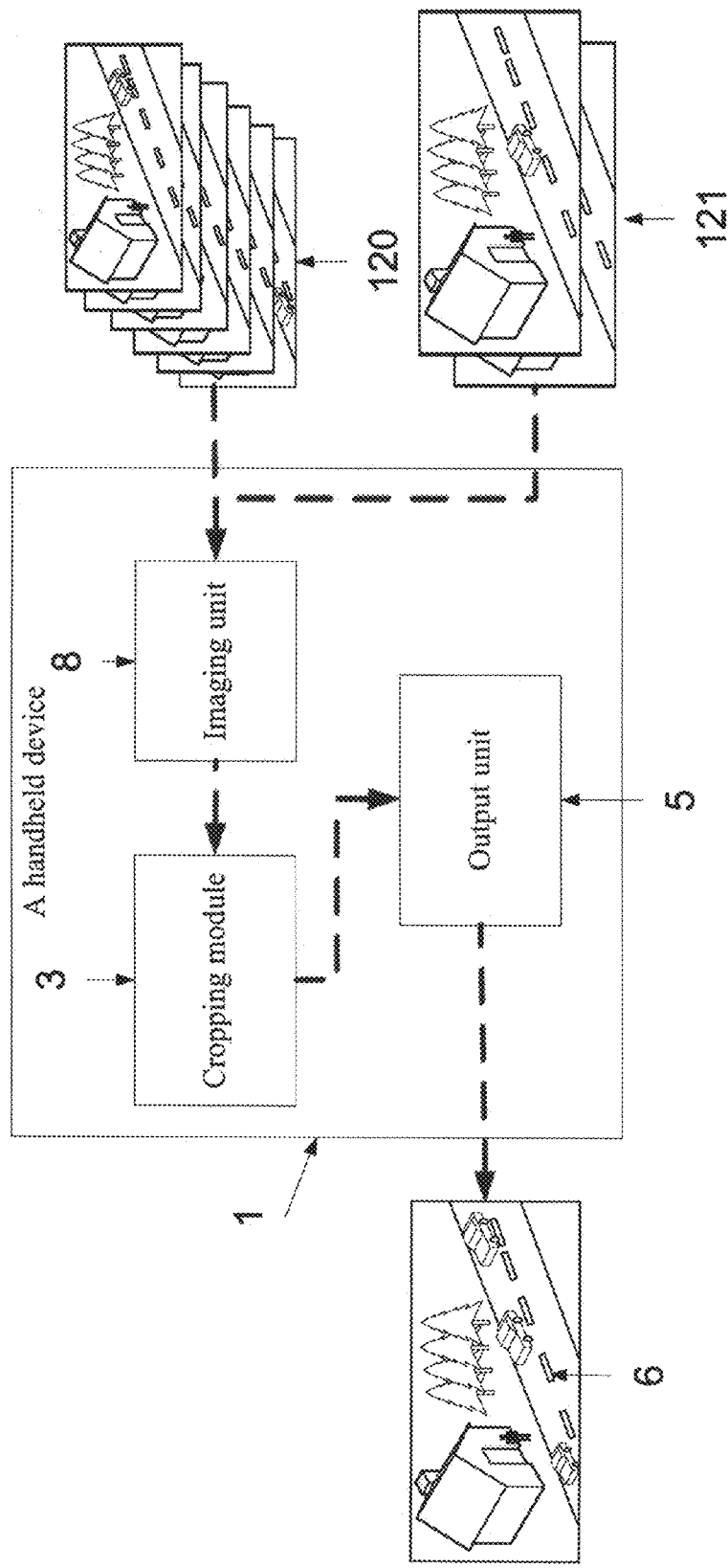

DESCRIPTION OF SPECIFIC EMBODIMENTS
OF THE INVENTION

The present invention, in some embodiments thereof, relates to an apparatus and a method for capturing an image and, more particularly, but not exclusively, to an apparatus and a method for capturing a digital image that depicts a scene with moving objects.

Some embodiments of the present invention are related to a method and an apparatus for capturing images of a scene in which one or more objects are in motion and creating a final representation, such as a combined image or an animated sequence, which clearly depicts the motion of one or more moving objects in a certain scene. Some embodiments of the present invention can be implemented using handheld devices, such as cellular phones, with limited computational abilities.

According to an aspect of some embodiments of the present invention there is provided a method for creating an image depicting a motion of a moving object. The method is based on identifying one or more moving objects in a sequence of images depicting a scene, such as a preview sequence. Then, a number of reference images that depict the moving object in a number of different locations along its motion vector are captured. The method further includes cropping one or more sub-images of the moving object from one or more of the captured reference images. Each one of the sub-images depicts the moving object in a different position in the scene. Now, the sub-images and one or more of the reference images can be combined for producing a final representation, such as an image or animation that depicts the moving object. The resolution of the initial images is lower than the resolution of the reference images. In such a manner, the computational complexity of part of the processing is incurred by the processing of low resolution images, while of the final representation is based on high resolution images.

Optionally, the final representation is a reference image that the sub-images have been embedded therein. The sub-images are embedded in an area of the scene that reflects the position of the moving object during the time the related cropped reference image have been taken. Optionally, the final representation comprises a reference image and a sequence of sub-images which are embedded in a sequential manner to the reference image, emulating the progress of the moving object according to its motion vector. When one sub-image is embedded, other sub-images which already have been embedded may or may not be reduced.

According to an aspect of some embodiments of the present invention there is provided a method for creating an image depicting a motion of an object. First, a sequence, such as a preview sequence that comprises a plurality of images is presented to a user. The sequence depicts a scene with a moving object. Optionally, the sequence is captured using a handheld device, such as a cellular phone, which is held and operated by the user. The device may include a user interface (UI) with a screen that allows the displaying of the sequence.

Then, at least one sub-image of the moving object is cropped from one or more images of the sequence according to an instruction which is received from the user. Optionally the UI includes input device, such as a keypad, a keyboard, a joystick or a touch-tone screen that allows the user to input instructions, for example by tagging the displayed moving object, changing the angle of the device in relation to the moving object, and/or selecting one or more images as reference images, optionally during the capturing of the images. Now, the sub-images and one or more of the images are combined to produce a final representation that depicts the motion of the moving object. Optionally, the final representation is a panoramic image that the motion of the moving object along it motion vector.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a handheld device 1 for creating a final representation 6 depicting a motion of an object in real time, according to one embodiment of the present invention. The handheld device 1 includes an imaging unit 8 for capturing initial images 120 and reference images 121 that depicts one or more moving objects, as described below and a cropping module 3 for analyzing the initial images 7 for cropping sub-images of the one or more moving objects from the reference images 121. The handheld device 1 further comprises a combining module 5 that combines the sub-images to a final representation 6 that depicts the motion of the one or more moving objects and may be referred to herein as a final image. The resolution of the reference images is higher than the resolution of the initial images. In such an embodiment, the handheld device 1 can identify the motion of the moving object according to an analysis of the initial images which have relatively low resolution and to combine sub-images which are taken from the reference images which have relatively high resolution. As used herein, a low resolution means quarter video graphics array (QVGA) resolution or any resolution which is about the QVGA resolution and a high resolution means a video graphics array (VGA) resolution or higher.

The analysis of low resolution images requires less computational power than the analysis of high resolution images. In such a manner, a handheld device 1 with limited computing power can produce the final image in real time. As used herein real time means delivering the final image in a range from milliseconds to a few seconds after the first reference image has been captured.

In one embodiment of the present invention, the handheld device 1 is a device with relatively limited computational power, such as a cellular phone, a Smartphone, or a personal digital assistant (PDA). In such an embodiment, the imaging unit 8 is a camera of the handheld device 1 and it includes an image sensor such as a CMOS based sensor and/or a CCD based sensor. Optionally, the imaging unit 8 captures the preview sequence 120 in a resolution which is relatively low. Optionally, the handheld device further comprises an integrated screen for displaying the preview sequence 120, thereby to allow the user to determine whether she wants to capture an image or a sequence of the scene that is depicted in the preview sequence 120. The low resolution allows the handheld device 1 to capture more frames per second and does not require a large frame buffer. As used herein, a preview sequence means a typical spatio-temporal signal such as a series of sequentially ordered images, a video sequence that is presented on the screen of the handheld device 1 in a camera preview mode, etc.

The initial images of the preview sequence 120 are analyzed by the cropping module that identifies accordingly which reference images 121 to capture. Optionally, the initial and reference images are captured by the same image sensor. Optionally, the reference image is a selected initial image. The cropping module crops one or more sub-images that depict the one or more moving objects from the reference images. The combining unit 5 combines the sub-images to create the final image 6 in a manner that it depicts the motion of the one or more moving objects.

Figure 2:
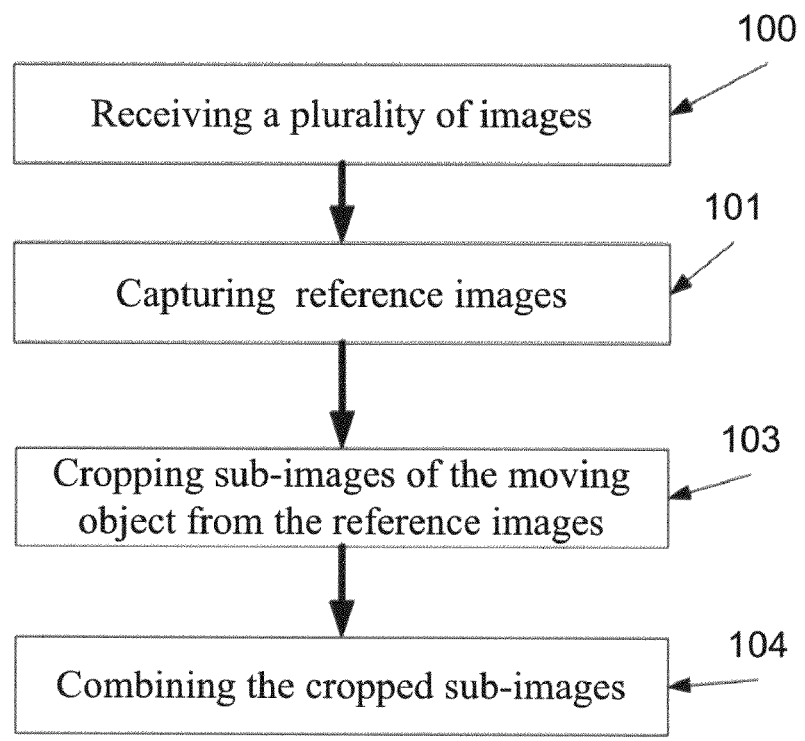

Reference is now also made to FIG. 2, which is a flowchart of a method for creating an image depicting a motion of an object, according to some embodiments of the present invention. FIG. 2 depicts a multi-stage method. During the first stage, as shown at 100, the imaging unit 8 captures, the preview sequence 120, as described above.

The initial digital images of the preview sequence 120 depict a scene with a background and one or more common moving objects. As used herein, a background means a set of one or more still, or substantially still, objects that appears, entirely or partly, in a number of sequential images which optionally depict a certain scene, such as a panoramic scene or a frame size scene.

Figure 3:
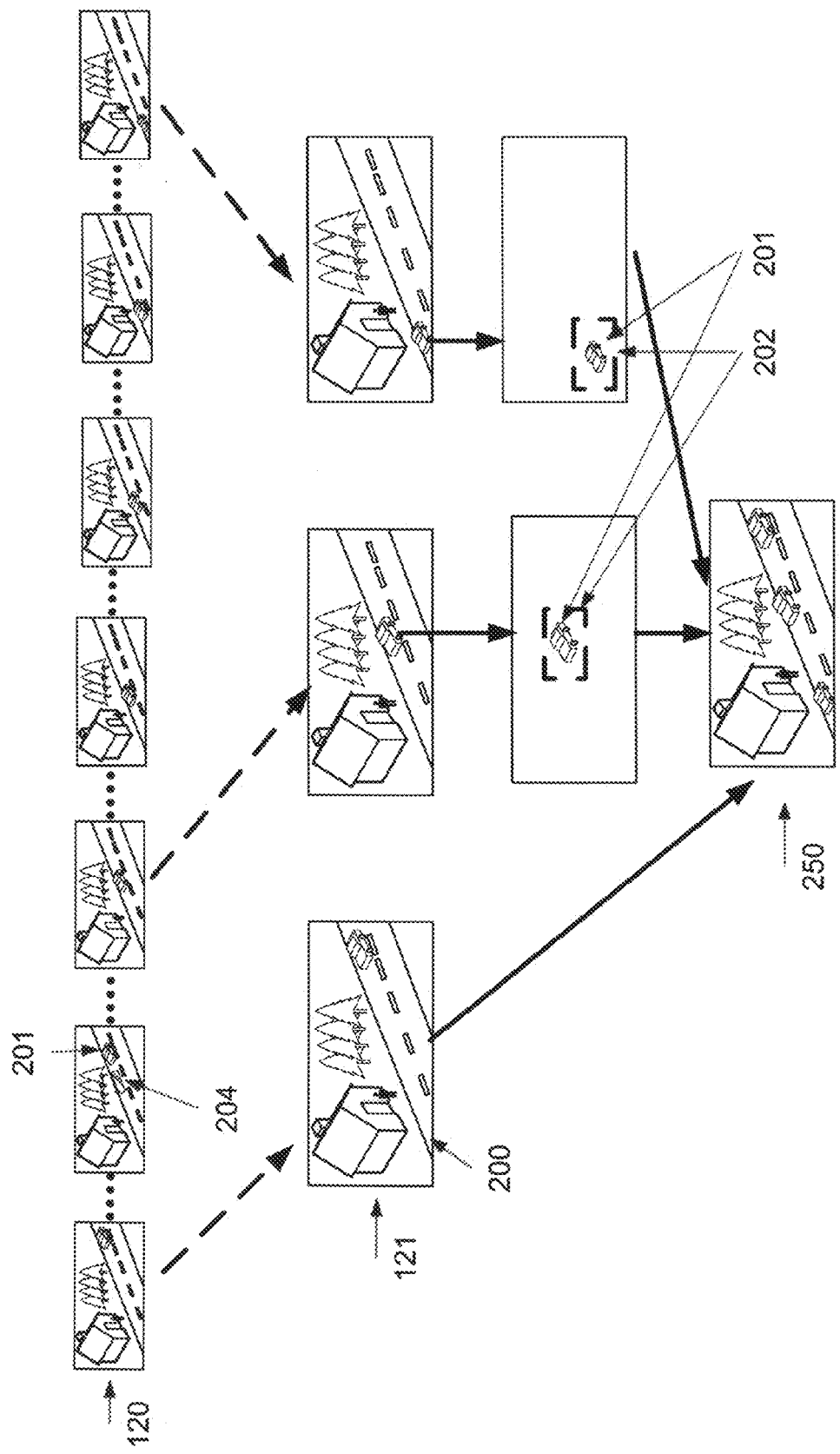

Reference is now also made to FIG. 3, which is a schematic illustration of an exemplary preview sequence 120, a set of reference images 121, and a number of exemplary sub-images 201 which are cropped from the reference images 121, according to one embodiment of the present invention. As described above, each one of the initial images depicts a certain scene with a number of still objects, which may be referred to as background, and moving objects, for example as the car which is shown at 201 that has a motion vector, for example as shown at 206.

As shown at 101 and described above, after the preview sequence 120 is received, the reference images 121 are captured. The reference images 121 are selected according to an analysis of the preview sequence 120, optionally in real time, while or right after each initial image is captured. The reference images are selected in a manner that they can be combined to depict clearly the motion of the moving objects. Furthermore, as described below, the reference images may be selected to assure that sub images that depict the moving objects do not overlap.

First, as further described below, the local motion of the one or more of the common moving objects, which are depicted in the preview images, in identified.

Figure 4A:
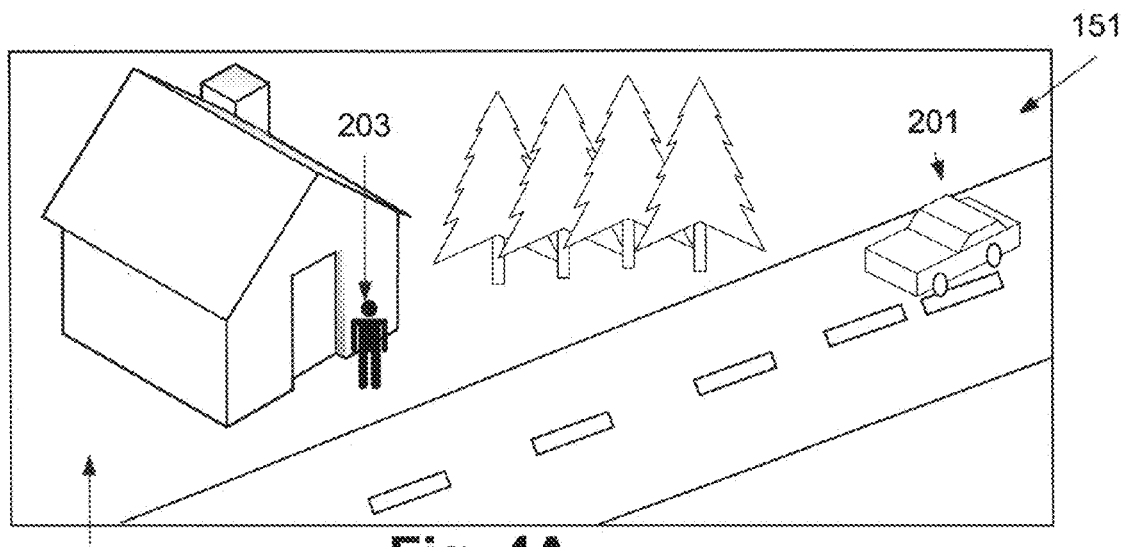
Figure 4B:
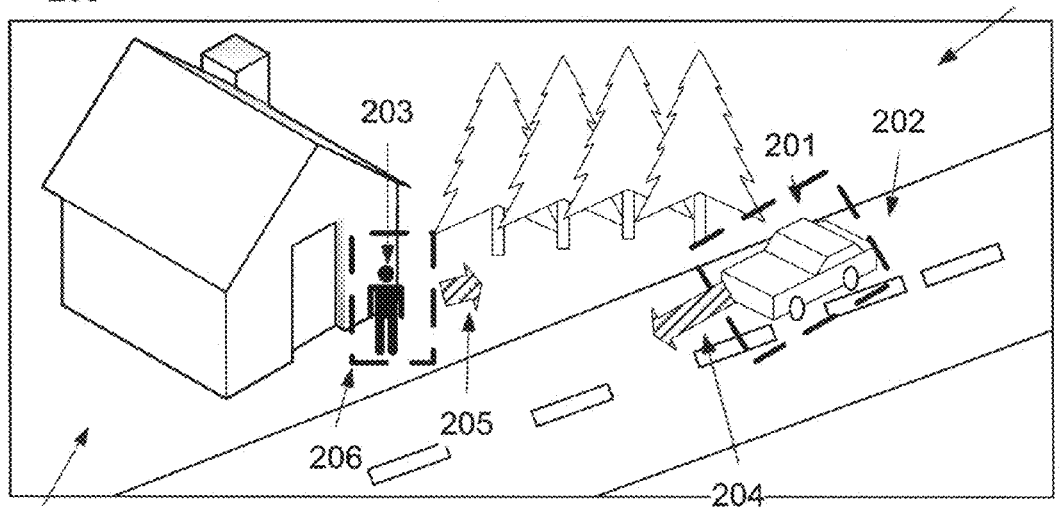
Figure 4C:
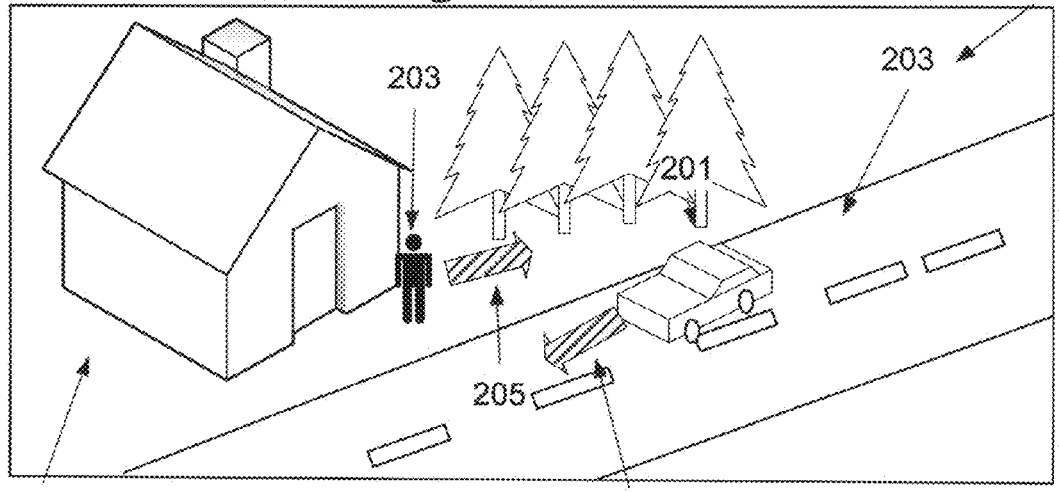

In one embodiment of the present invention, for each pair of preview images, for example as shown at FIGS. 4A-4C, a local motion is expressed with respect to a former image, for example as shown at 151, and a latter image, for example as shown at 152. Unlike a global motion, which is an outcome of camera movements and/or changes in the zoom, a local motion is an outcome of an actual movement of an object in the scene that is captured in the preview sequence. Briefly stated, a local motion is the change in the position of one object in the former digital image in relation to its position in the latter digital image, for example the change in the position of the car 201 between FIGS. 4A and 4B.

The use of an image sequence, such as the preview sequence 120, for detecting the local motion of the moving object has lower computational and memory requirements and is based on images that have been taken with a short time-lapse in between. Such a short time lapse allows the calculating of an accurate motion vector that can be used for improving the cropping of the reference images and optionally the calculation of the adjusted camera motion, for example as described below.

Optionally, a motion detection area 200 is set in a frame that defines the boundaries of each one of the initial images. As used herein a motion detection area means the area that is analyzed by the handheld device 1.

As the initial images are taken in a manner that they depict a certain scene, the motion detection area bounds a relatively fixed and/or continuous area that is similar in the entire preview images of the sequence. In such an embodiment, a local motion is a local change between the motion detection area in the former and the latter digital images. Optionally, the local motion of an object, which is depicted in the former and the latter digital images, is represented by a single vector, for example as shown at 204, 105, which may be referred to herein as a local motion vector.

Optionally, the local motion is detected in a local motion identification process, such as an optic-flow algorithm, for example the optic-flow algorithm that has been published by A. Bruhn et al., see A. Bruhn et al. *Real-Time Optic-flow Computation with Variational Methods*. In N. Petkov, M. A. Westenberg (Eds.): *Computer Analysis of Images and Patterns. Lecture Notes in Computer Science, Vol* 2756, Springer, Berlin, 222-229, 2003 and A. Bruhn et al., "*Combining the advantages of Local and Global Optic-flow Methods*, L. Van Gool (Ed.), *Pattern Recognition, Lecture Notes in Computer Science, Vol.* 2449, Springer, Berlin, which are incorporated in their entirety by reference into the specification.

Optionally, a local motion is detected only if the area of the moving object exceeds a certain dimension threshold. Optionally, the dimension threshold is defined as a percentage from the total area of the motion detection area. Optionally, the dimension threshold is defined by the user. In such a manner, the user can determine whether only the essence of the captured sequence is cropped or any moving object that is detected in the captured scene.

Optionally, after one or more local motion vectors of one or more moving objects are identified, for example as described above, the local motion vectors are compared with a threshold, such as a threshold vector and/or value, which defines a minimum motion level. Such a threshold may determine which moving objects are cropped, as further described below. For example, as shown FIGS. 4A-4C, the car 201 has a motion vector 204 that is above the threshold vector and the person has a motion vector 205 that is below the threshold vector. Optionally, such a threshold vector may be selected dynamically by the user of the imaging device 1. For example, the user may select one out of a number of possible thresholds, each associated with a threshold vector that defines a different motion level. As used herein, a substantial motion means a motion above a certain threshold, such as a threshold vector and/or a threshold value.

After one or more moving objects are identified, a reference image that depicts the scene and the one or more of the moving objects is captured and optionally stored for processing, such as cropping, as further described below. In order to create the motion effect in the final image, a number of reference images 121 are needed. Optionally, in order to assure that the captured reference images 121 can be used for the creation of a final image that depicts the motion of the moving element without making it indistinct or obscure, the reference images 121 are optionally selected in a manner that they depict the moving element in non-overlapping, or substantially non-overlapping, positions. In such a manner, the coordinates of the combined sub-images do not overlap and the final image depicts the motion of the moving object without a blur.

Optionally, the reference images 121 are selected in a manner that each one of them includes a background area that allows the registration thereof. Optionally, the reference images are selected according by computing a camera movement registration. Optionally, a time criteria, optionally dynamic, is applied during the process of capturing the reference images 121. The time criteria may be determined according to the motion of the moving object, the motion of the camera, and/or by a predefined interval.

Figure 5:
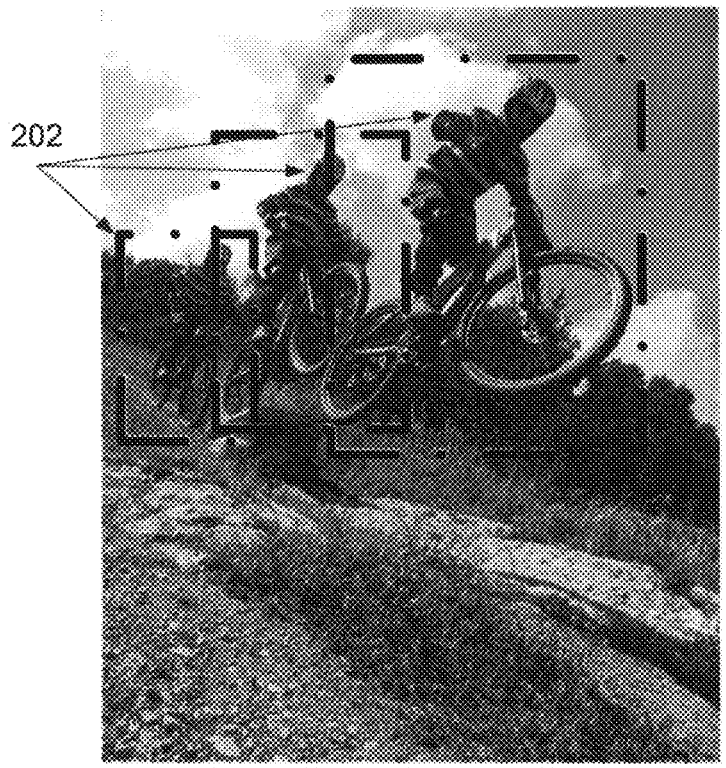
Figure 6:
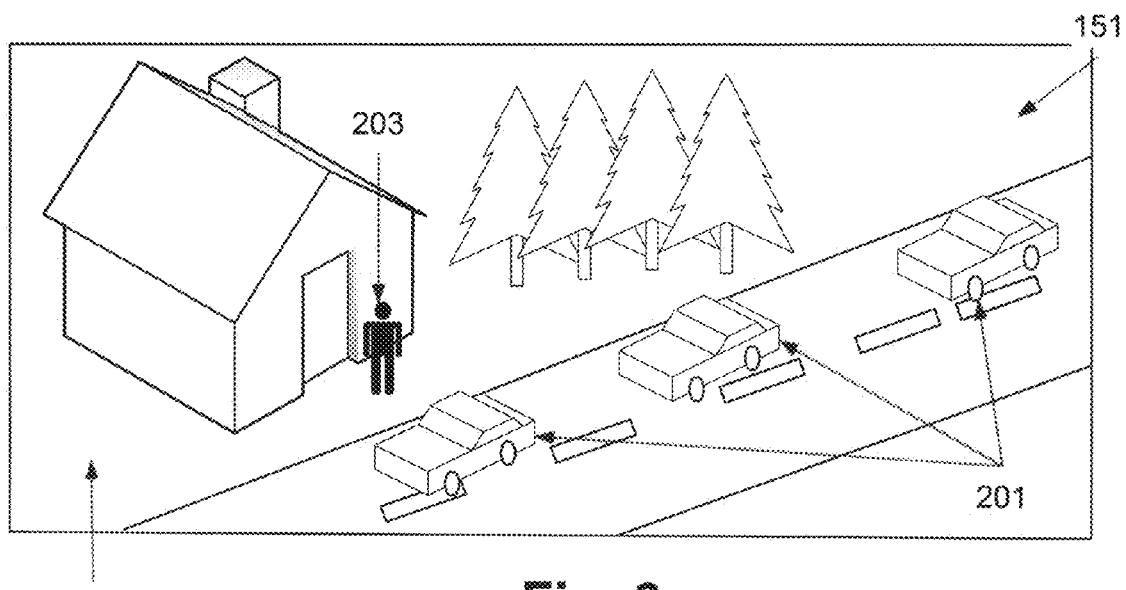

Optionally, in order to avoid overlapping, once a moving object has been detected, overlapping boundaries are marked in the motion detection area. The following captured reference image is optionally taken when the moving object is detected outside these boundaries. Optionally, the area which is bound by the overlapping boundaries is defined by the user. In such a manner, the intensity of the motion effect that is created by combining the cropped sub-images, for example as depicted in FIGS. 5 and 6, can be adjusted by the user. Optionally, the area which is bound by the overlapping boundaries is defined in compression domain blocks, for example in blocks of 16×16 pixels, as defined in color joint photographic experts group (JPEG) images. In such a manner, the process of determining whether to capture a reference image or not may be determined based on the analysis of the preview images, without a complete decoding thereof.

Optionally, the initial images are encoded as JPEG images, which are optionally defined in a JPEG international standard organization (ISO)/international electro-technical commission (IEC) 10918-1 international telecommunication union (ITU)-T recommendation T.81, which is herein incorporated in its entirety by reference into the specification. As commonly known, the key to a JPEG conversion is a discrete cosine transform (DCT) of N×N blocks. Each block is computed using the DCT, the results are quantized, and then entropy is coded.

In such an embodiment, in order to reduce the computational complexity of the local motion detection process, the initial images are not completely decoded and the local motion is detected by analyzing the N×N blocks. Though the computed N×N DCT blocks do not provide full information about the brightness and the color of respective sections of the related encoded digital image, they may be compared with respective N×N DCT blocks for detecting local motion. Optionally, only the center of gravity of the one or more moving objects is identified and detected in a manner that allows the calculation of the local motion thereof. Optionally, DCT coefficients, such as AC and DC coefficients, of a former initial image, are compared with respective DCT coefficients of a latter initial image in order to detect local motion, substantially as described above. Each block has a coefficient that represents the average color and/or the brightness level of a certain block in the N×N DCT blocks that comprise every JPEG image, optionally an 8×8 block. Therefore, processing DCT coefficients of a certain digital image requires substantially less computational complexity than processing the digital image itself. In such a manner, the initial images are optionally not completely decoded and the computational complexity of detecting the local motion is reduced.

As described above, a reference image is captured only if the moving object is in a non-overlapping position in relation its position in previous reference images. Optionally, the boundaries of the moving object are situated to define an area that encircles a number of DCT blocks. In such a manner, a non-overlapping moving object can be identified without completely decoding the initial images.

Optionally, a certain overlapping between areas that depicts the moving objects in different images is allowed. Optionally, the allowed overlapping covers a predefined percentage of the area in the frame that bounds the moving object.

Optionally, a certain reference image is captured only if the distance between the center of gravity of the moving object in the currently probed initial image and the center of gravity of each one of the moving object in the previously captured reference images is greater than a predefined threshold. Optionally, the distance is a derivative of the size of the motion detection area and/or the area that bound the moving object. Optionally, if the length of the sequence is defined in advance, the distance is a derivative of the number of images in the sequence. Optionally, for a sequence of N images, the distance is at least 1/(N+1.2) of the area of the motion detection area.

Optionally, the reference images 121 have a higher resolution than the resolution of the initial images that comprise the preview sequence 120. As only few reference images 121 are captured, the computational complexity and/or the memory that is needed for the method which is depicted in FIG. 2 is relativity limited. In such a manner, an image that depicts the motion of a moving object, for example as shown at 250, can be generated using a handheld device with relatively low computational complexity, such as a cellular phone or a PDA, optionally as described above.

For each moving object, after a set of reference images, as shown at 121, has been captured, as shown at 103, an area or sub-image 202 that encircles the moving object is cropped and may be referred to as a cropped sub-image or a sub-image. Optionally, one or more sub-images 202 that depict the moving object along its moving trajectory are cropped from following images of the sequence, optionally as described below.

Figure 7:
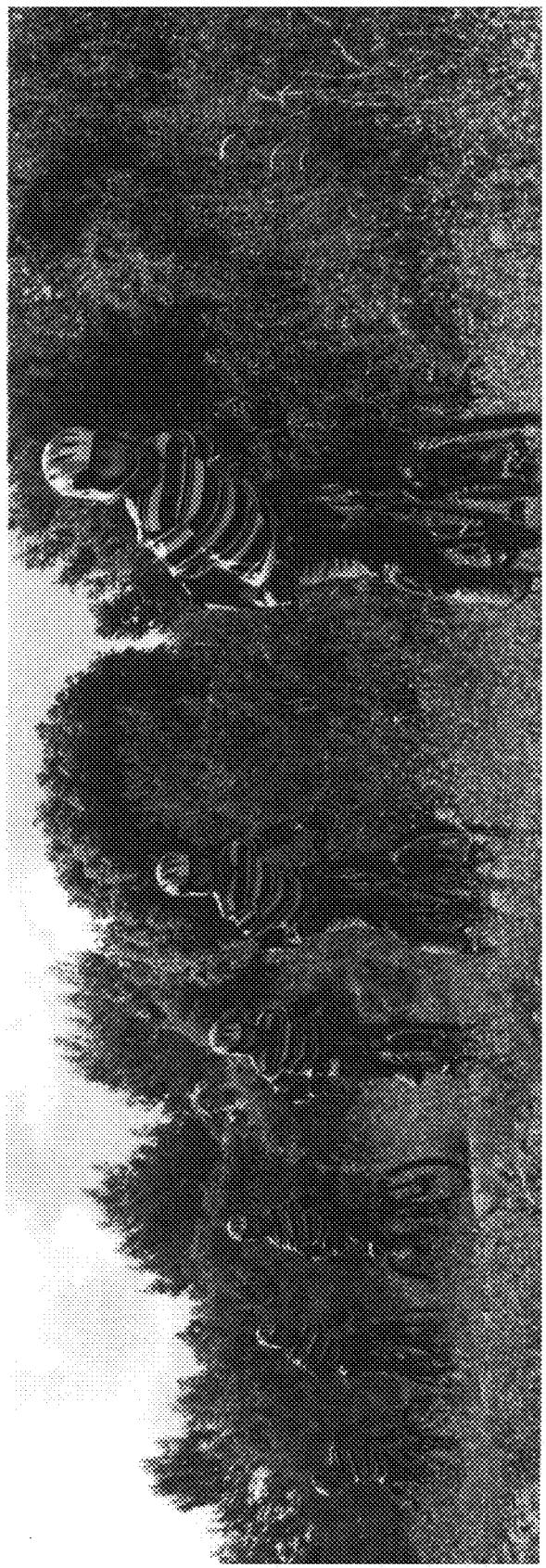

Optionally, a sub-image 202 is cropped by identifying a group of connected, or substantially connected, pixels which are found around the center of gravity of the moving object in the former image that also appears around the center of gravity of the moving object in the latter image In one embodiment of the present invention, the method is used for capturing a panoramic image that depicts the motion of a moving object, for example as shown at FIG. 7, which is an exemplary panoramic image that depicts the motion of a moving object that is captured according to one embodiment of the present invention. Optionally, in order to capture such a panoramic image, the imaging device 1 that captures the sequence is tilted. Optionally, in order to assure that the local motion, which is calculated in order to detect the motion of the moving objects, is accurate, the global motion that is caused by the tilting of the imaging device is calculated and neutralized from the calculation of the local motion. Optionally, the global motion is detected in a global motion identification process that is based on a variant of the Lucas-Kanade global-motion algorithm, see D. Lucas et al, *An Iterative Image Registration Technique With an Application to Stereo Vision, Proc 7th International Joined Conference on Artificial Intelligence (IJCAI)*, 1981 Aug. 24-28, Vancouver, British Colombia, pp. 674-679, which is incorporated in its entirety by reference into the specification.

Optionally, in order to improve the final image, the reference images 121 are assembled together according to a method for assembling images which is disclosed in patent application Ser. No. 11/826,767 filed on Jul. 18, 2007, which is incorporated herein by reference.

As commonly known, the creating of a panoramic image, for example as described in patent application Ser. No. 11/826,767 filed on Jul. 18, 2007, is usually performed, inter alia, by image stitching process. This is usually done by (a) analyzing, optionally using a designated module, the translation and the rotation between any two sequencing images, for example using the aforementioned Lucas-Kanade method, (b) stabilizing the images so that every two images differentiate from each other only in their horizontal component, and (c) stitching a panoramic image from the sequential images. The stitching of two sequential images is usually done by combining similar strips that appear in each one of them. As the scene that is depicted in the reference images which are used for creating the panoramic image depicts one or more moving objects, the outcome of such an image stitching process may include undesired artifacts and/or incorrect alignment. For example, as the moving object is in motion, it is depicted in different locations in relation to the background that is depicted in one or more of the images. Such a difference may distort the stitching process and may also prevent the identification similar strips in sequential images, which may be referred to herein as stitching strips. In order to avoid such artifacts, misalignments, and/or distortions, the effect of the moving object on the calculations, which are performed during one or more of the stages of the image stitching process, is removed. As described above, the local motion of the one or more moving objects is calculated by analyzing the initial images. This local motion is optionally used for identifying the local motion of the moving objects and for reducing the impact thereof on the calculation of image stitching process. In one embodiment of the present invention, the local motion of the moving objects is used for predicting the prospective location of the moving object.

Figure 9:
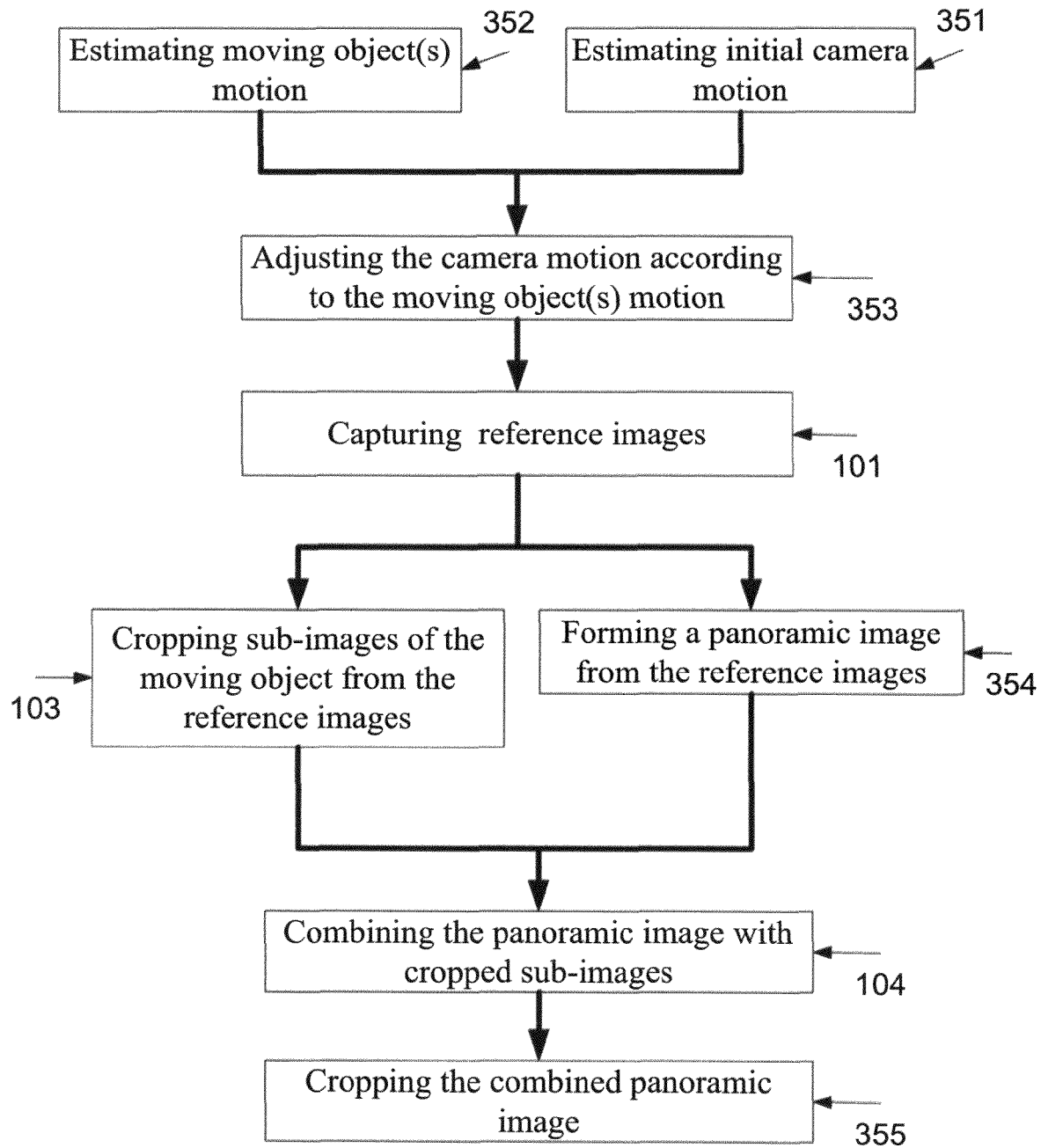

Reference is now made to FIG. 9, which is a flowchart of a method for creating a panoramic image, according to some embodiments of the present invention. Block 101, 103, and 104 are as described above, however blocks 351-355 are new.

As shown at 351, the motion of the camera is estimated by an initial estimation. The camera of the motion is optionally identified using global motion algorithms, for example as described in patent application Ser. No. 11/826,767 filed on Jul. 18, 2007 which is incorporated herein by reference. Optionally, the initial estimation is calculated according to the images of the preview sequence 120. As shown at 352, the local motion of the one or more moving objects is also estimated, optionally by comparing the images of the preview sequence 120 and/or as described above. Optionally, the images are registered before the local motion and/or the camera motion are estimated. Now, as shown at 353, the initial estimation of the camera motion is adjusted according to the local motion of the one or more moving objects. The effect of the local motion of the one or more moving objects on the initial estimation of the camera motion is reduced or removed during the adjustment. The adjustment can be applied iteratively or by predictions of the motion of the one or more objects and the camera which are respectively calculated according to the previously calculated object motions and camera motion. Then, as shown at 101, a number of reference images, such as 121, are captured, optionally as described above. Now, as shown at 354, the reference images combined to form the panoramic image, optionally by stitching, for example as described in patent application Ser. No. 11/826, 767 filed on Jul. 18, 2007 which is incorporated herein by reference. Optionally, the stitching includes removing, or substantially removing, the moving objects from the reference images. Optionally, strips which are about to be stitched during the stitching process are selected in a manner that they do not depict the moving object or any portion thereof. Now, as shown at 103, sub-images that depict the moving objects are cropped, optionally as described above. Optionally, the cropping in performed in the light of the motion of the camera, optionally as described above with relation to FIG. 7. Optionally, the cropping in performed in the light of the aforementioned registration. Now, as shown at 104 and described above, the cropped sub images are optionally combined with the panoramic image that has been generated in 354. Such a combination allows the generation of a panoramic image that depicts the motion of the moving object.

Figure 10:
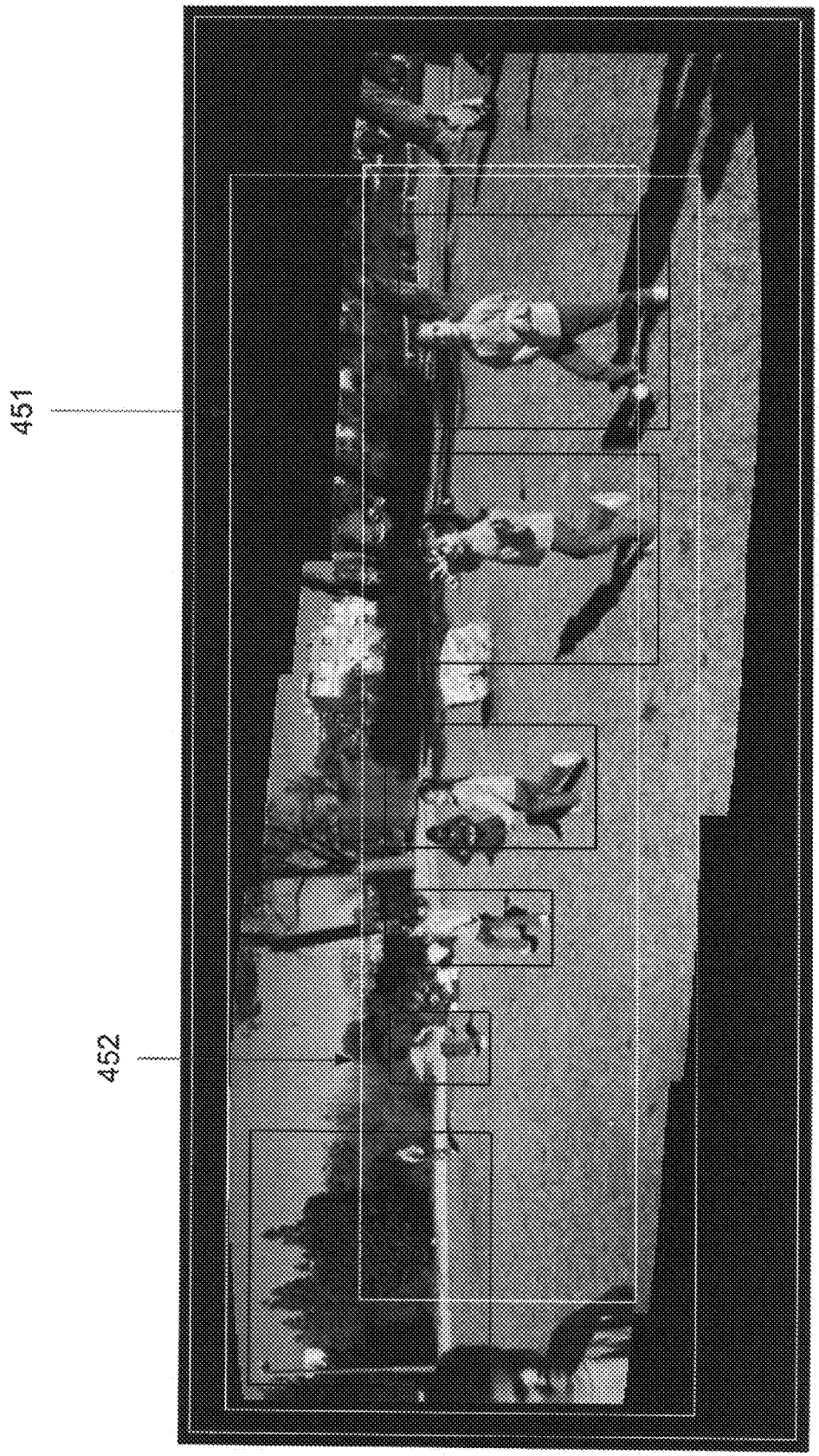

It should be noted that the stitched images may have been taken along a diagonal or an undulant tilting movement, for example as shown at FIG. 10, which is a panoramic image that include a number of stitched images. In such an embodiment, the sides of the panoramic image may not be aligned along the general tilting direction of the camera motion. For example, if the user tilts the camera in a lateral manner in order to follow the progress of a moving object, the panoramic image may have a nonuniform upper and lower sides, for instance as depicted in FIG. 10. Such nonuniform sides may add non-depicting areas to the output of the panoramic image, for example as shown at 451. Optionally, in order to reduce the non-uniformity of the sides of the panoramic image and to reduce or to remove the non-depicting areas, the panoramic image is cropped, as shown at 355. Optionally, cropping is based on the location of one or more of the moving objects which are depicted in the panoramic image. Optionally, the boundaries of the cropped panoramic image are defined to assure that the depicted moving objects are within the boundaries of the cropped panoramic image, for example as shown at 452.

Figure 8:
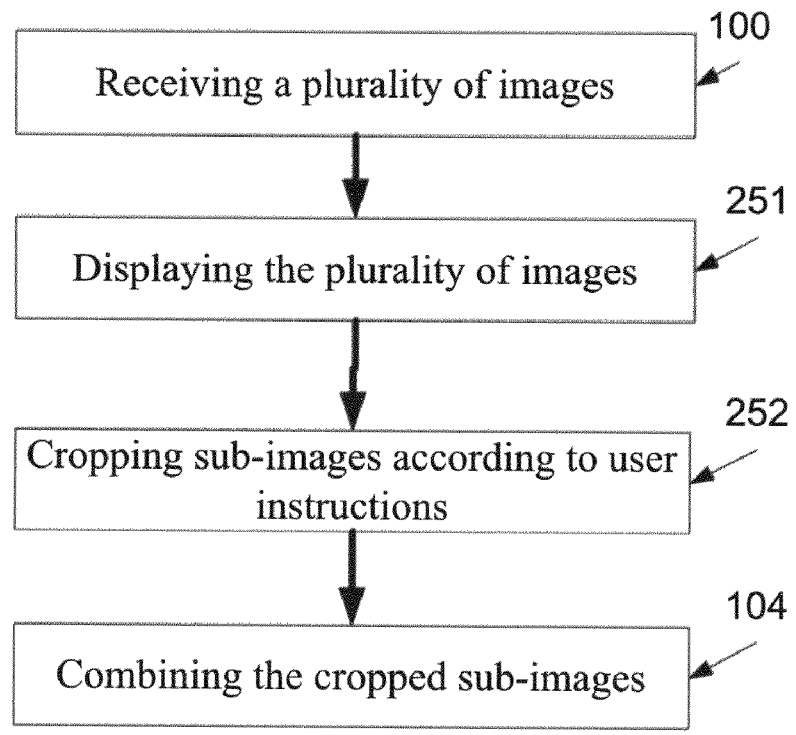

Reference is now made to FIG. 8, which is a flowchart of a method for creating an image depicting a motion of an object, according to some embodiments of the present invention. Blocks 100 and 104 are as depicted in FIG. 1, however FIG. 8 further comprises blocks 251 and 252 that depicts an interactive sub-process that allows the user of the device which is used for capturing the plurality of images, as shown at 100, to be involved in the process of selecting a moving object and acquiring enough images thereof for allowing the creation of a final image, as shown at 104 and described above. As shown at 251, the plurality of images which are received, optionally as described above, are displayed to a user, such as a user of a cellular phone with a camera which is used for capturing the received images. Then, as shown at 252, the one or more sub-images of the moving object are cropped according to an instruction received from the user, optionally as described below. Now, as shown at 104 and described above a final image that depicts the motion of the moving object is created.

Figure 11:
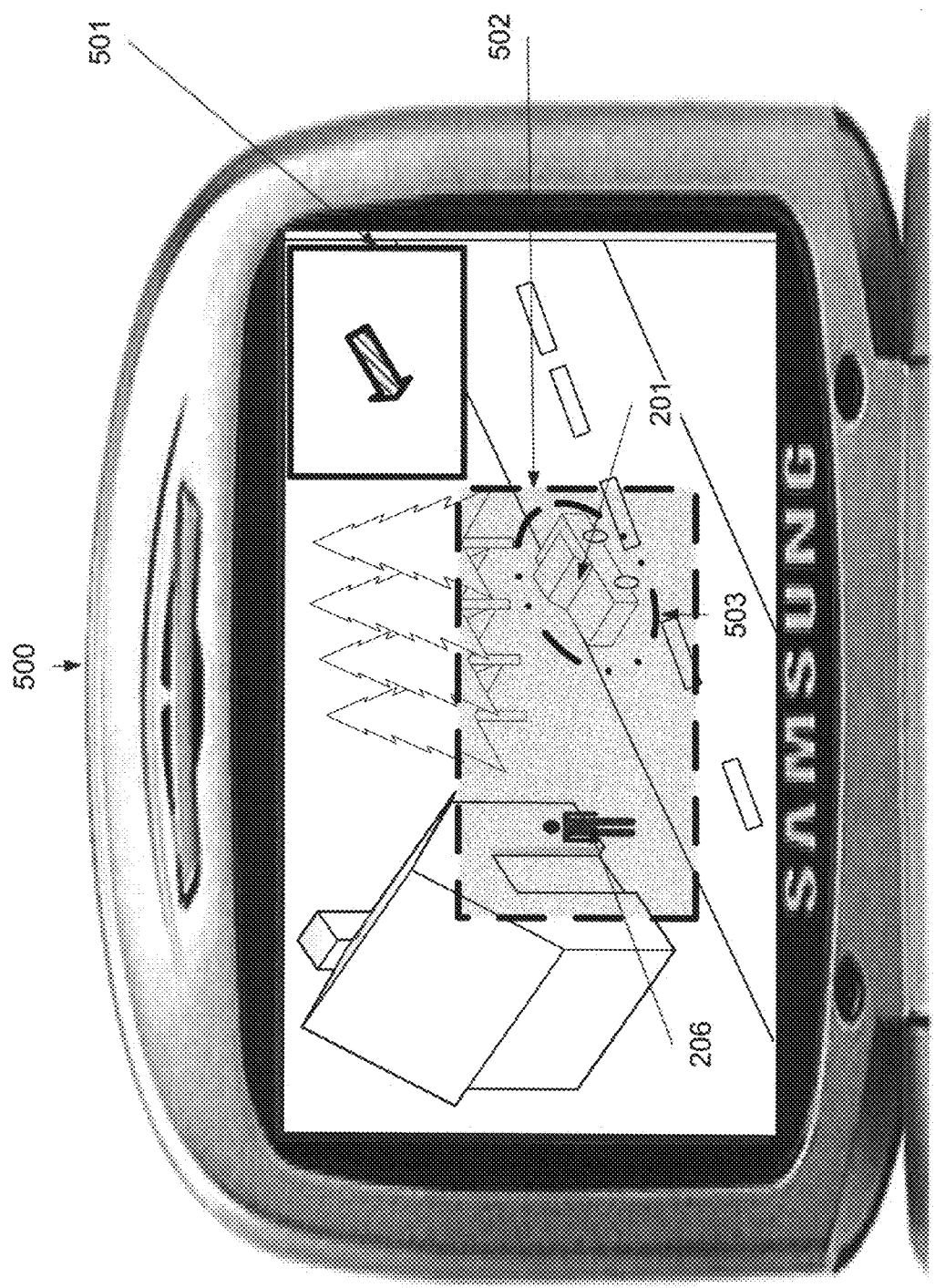

Reference is now also made to FIG. 11, which is a schematic illustration of an exemplary display 500 of an exemplary handheld device 1, a cellular phone, according to one embodiment of the present invention. Optionally, the handset device 1 comprises a user interface for allowing the user to interactively participate in the process of acquiring the images of the moving object, as shown at 251 and 252. Optionally, the handheld device 1 is a cellular phone that comprises a display, as shown at 500, and a standard twelve key telephone keypad that allows the user to input instructions. The keypad is optionally displayed on a touch screen.

Optionally, in order to acquire the reference images which are needed in order to assemble the final image, a user interface, which is adapted to aid the user to align the reference images of a panoramic image with a view area of a camera incorporated in the handheld device 1, is used. The interface is based on a motion direction indicator which is visible to the user, for example as shown at 501, and/or a next frame alignment indication, both optionally as disclosed in patent application Ser. No. 11/826,767 filed on Jul. 18, 2007, which is incorporated herein by reference. Optionally, the motion direction indicator 501 and/or the next frame alignment indication are calculated with respect to the local motion of the one or more moving objects which are cropped or about to be cropped.

Optionally, in order to assure that the moving object is found completely in the reference images, an image center indicator, for example as shown at 502, is displayed on the screen 500 of the handheld device 1. The image center indicator 502 allows the user to verify that the moving object she wants to record is be captured even if the moving object makes sharp movements or increases its velocity by keeping it in the boundaries of the image center indicator 502, optionally as shown at FIG. 11.

As described above, the initial images 120 may depict more than one moving object, for example as shown at 201 and 206. For brevity, the one or more moving objects according to which the reference images are selected are referred to herein as the targeted moving objects. In order to indicate to the user which moving object are the targeted moving objects, a moving object indicator is displayed to the user. The moving object indicator is optionally a frame that encircles the targeted moving object, for example as shown at 503. Optionally, the frame that encircles the targeted moving object is displayed in a full screen mode on the exemplary display 500. In such an embodiment, though the captured images depict a wider shot of the scene, the user is displayed with a frame that facilitates the positioning of the moving objects in an optimal, or relatively optimal, location for cropping. Optionally, the frame that encircles the targeted moving object is selected in the light of the local motion of the moving object, the camera motion, and/or the adjusted camera motion that is calculated as described above with relation to FIG. 9. Optionally, the boundaries of the frame are calculated to assure that the captured images have a stitching strip with a sufficient width.

Optionally, the user interface allows the user to change the targeted moving object by using the input interface, such as the aforementioned keypad, for inserting instructions for new moving objects. Optionally, the user may press 4, 6, 8, and/or 2 to select a new targeted moving object to the left, right, up, and/or down of the current targeted moving object.

Optionally, the user interface alarms the user whenever the moving object is about to come out of the frame before enough reference images have been taken. Such an alarm may be activated whenever the moving object is detected in boundaries around of the frame. The alarm may be visual, such as an indicator on the screen of the handheld device 1, audible, such as an alarming sound that is generated by the speakers of the handheld device 1, or tactile, such as a vibration that is generated by a vibrating element which is incorporated into the handheld device 1.

As described above, after one or more moving objects 201 are detected, motion vectors are calculated and reference images that depict the one or more moving objects are captured in order to allow the creation of the final image, optionally as described below.

Optionally, the handheld device 1 displays the captured reference images and allow the user to select from which reference images the sub-images are cropped.

Reference is now made, once again, to FIG. 2. As shown at 104, such a cropping allows the creation of a final image that depicts the motion of one or more moving objects on a certain background by combining the cropped sub-images. As used herein, a final image that reflects or depicts the motion of the moving object means a final image that depicts the moving object in different positions in which the moving object has been during a predefined period.

As the received images depict the same, or substantially the same, scene or part of a panoramic scene, a still final image that depicts the motion of one or more moving objects may be created by adding the sub-images, in there respective coordinates, to one of the received images, for example as shown at 250 and in FIG. 5, which is an exemplary image of an image that combines a number of cropped sub-images 202 and according to FIG. 6.

Optionally, the final image is an animated image in which the sub-images are used for animating the scene that is depicted in the outputted image. The animated image may be created by embedding the sub-images in a sequential manner, optionally from the first to the last or vice versa. Optionally, after certain sub-image is embedded Other sub-images may or may not be reduced. Optionally, in such an embodiment, the sub-images are embedded to a base image that is created by removing the moving objects therefrom. The moving objects may be removed by replacing the pixels that represent the moving objects in one of the received images and replacing them with respective pixels in respective coordinates which are taken from one of the following images in which the moving object is in separate area of the frame. In such a manner the base image may be displayed without the one or more moving objects which may be added thereto in a sequential, or a non-sequential, manner later on.

Figure 12:
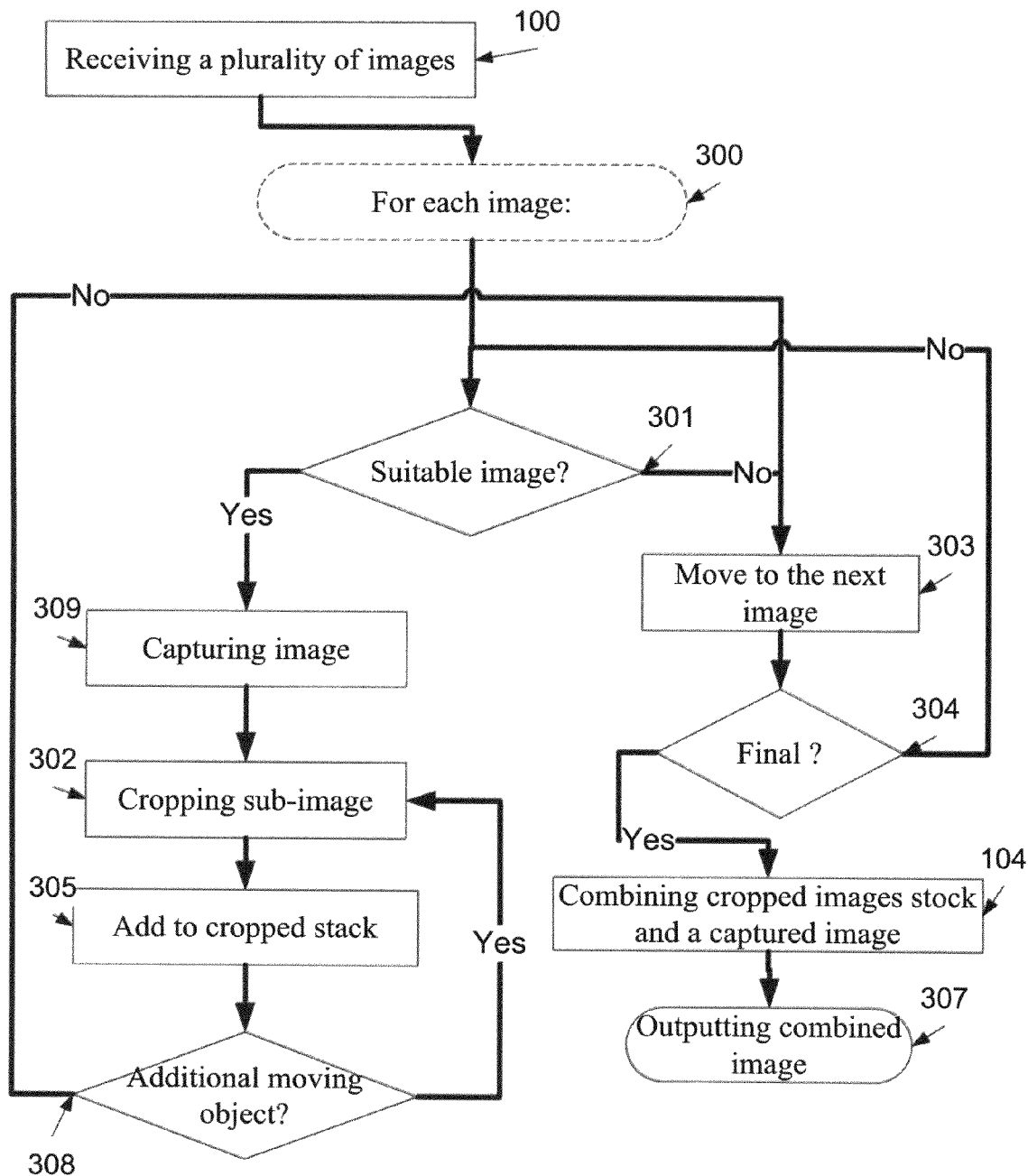

Reference is now made to FIG. 12, which is a flowchart of a method for generating a final image depicting a motion, optionally substantial motion, of one or more objects, according to some embodiments of the present invention. Blocks 100 and 104 are as depicted in FIG. 2, however FIG. 12 further depicts blocks 301-309 that outline stages in processing each one of the images of the received sequence. It should be noted that the stages depicted in 301-309 may be performed on a stored sequence or in real time, during the capturing of a series of initial images that comprises the sequence. Furthermore, if the sequence is stored, the order of images may be from the latest to oldest or vice versa.

As shown at 301 and at 308, one or more moving objects are optionally looked for in each image of the preview sequence or in every second, third, fourth, etc. image of the sequence. In 301, a preview image is probed and optionally, as described above, triggers the capturing of a reference image, as shown at 309.

As shown at 302, a sub-image that depicts the moving object is cropped and stored, for example as shown at 305. The cropped sub-image is added to a stack of cropped sub-images. Optionally, each cropped sub-image is tagged with an object ID that allows the association thereof with other cropped sub-images of the same object. In such a manner, a number of moving objects may be identified, cropped, and outputted simultaneously.

As shown at 304, the process of cropping sub-images that depict the identified moving objects is iterative. Optionally, this process is repeated until a predefined number of cropped sub-images are gathered. Optionally, this process is repeated for a predefined number of iterations, a predefined period, and/or for a predefined number of iterations or a predefined period after the last sub-image has been cropped.

Optionally, this process is repeated until the boundaries of the moving object intersect with the boundaries of the motion detection area. Optionally, this process is repeated until instructions are received from the user of the imaging device that implements the process. Optionally, this process is repeated until a global motion, optionally above a certain threshold, is detected. Optionally, this process is repeated until the scene or a predefined percentage from the total number of the pixels thereof is changed.

As described above, the motion of the moving object is detected in the preview sequence 120. Optionally, the processes which are depicted in FIGS. 1 and 10 are performed using a camera, such as a digital camera, a camera of a cellular phone, or a PDA and used for capturing an image that depicts the motion of a moving object, as described above and shown at FIG. 5. As the sequence of images is taken during a certain period, the imaging device which is used for capturing the images may tremble and therefore the scene which is depicted in the motion detection area may vary. In the light of these trembles, the coordinates of the moving objects may not be uniform in relation to the background. In order to avoid such an imprecision, the images of the sequence may be registered before the local motion is calculated and/or before the sub-images are cropped. In such a manner, the coordinates of the sub-images in the final image reflect the position of the moving object in relation to the background in a more accurately.

It is expected that during the life of a patent maturing from this application many relevant apparatuses and methods will be developed and the scope of the term an image sensor, a sequence, and a digital image, are intended to include all such new technologies a priori.

As used herein the term "about" refers to ±10%. The terms "comprises", "comprising", "includes", "including", "having" and their conjugates mean "including but not limited to". The term "consisting of means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure. As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for creating an image depicting a motion of a moving object, said method comprising:
   a) identifying a motion of a moving object in a plurality of initial images depicting a scene;
   b) using said motion for capturing a plurality of reference images of said moving object;
   c) cropping at least one sub-image depicting at least said moving object from at least one of said plurality of reference images; and
   d) combining said at least one sub-image and at least one of said plurality of reference images to produce a final representation depicting said motion,
   wherein said images are captured by a camera.

2. The method of claim 1, wherein the resolution of said plurality of initial images is lower than the resolution of said plurality of reference images.

3. The method of claim 1, further comprising identifying said moving object in a plurality of nonoverlapping areas in said plurality of initial images before b), said capturing being performed according to said plurality of nonoverlapping areas.

4. The method of claim 1, further comprising identifying said moving object in a first and a second of said plurality of initial images before b), said capturing being performed according to said first and second initial images, wherein said first and second initial images depicting said moving object in first and second positions, said first and second positions being located in a predefined range from one another.

5. The method of claim 1, wherein each said initial image is a joint photographic experts group (JPEG) image, wherein said identifying comprising identifying said motion according by comparing discrete cosine transform (DCT) coefficients of former and later of said plurality of initial images.

6. The method of claim 1, wherein said capturing comprises:
   capturing a first reference image and identifying boundaries encircling said moving object therein before b), wherein each said reference image depicting said moving object outside of said boundaries.

7. The method of claim 1, further comprising assembling at least two of said plurality of reference images to create a panoramic image before said combining, said combining comprising combining said at least one sub-image and said panoramic image to produce said final representation.

8. The method of claim 1, wherein said identifying further comprises displaying to a user an indicator indicative of said motion.

9. The method of claim 1, wherein said identifying further comprises:
   calculating a distance between said the boundaries of an initial image depicting said moving object and said moving object, and
   alarming a user if said distance exceeds a predefined distance threshold.

10. The method of claim 1, wherein said final representation comprises a member of a group comprising: a still image, a sequence in which said motion being animated, a still image animated with said motion.

11. The method of claim 1, wherein said identifying comprises identifying a plurality of motions of a plurality of moving objects in said plurality of initial images, each said reference image depicting said plurality of moving objects, said cropping comprising cropping at least one sub-image of each said moving object from at least one of said plurality of reference images, said final representation depicting said plurality of motions.

12. The method of claim 2, wherein the resolution of said plurality of initial images is around quarter video graphics array (QVGA) resolution and the resolution of said plurality of reference images in around video graphics array (VGA) resolution.

13. A handheld device for capturing an image depicting a motion of a moving object, comprising:
   an imaging unit configured for capturing a plurality of initial and reference images;
   a cropping module configured for identifying a motion of a moving object by analyzing said plurality of initial images and for using said motion for cropping at least one sub-image depicting at least said moving object from at least one of said plurality of reference images; and
   a combining module configured for combining said at least one sub-image and at least one of said plurality of reference images to produce a final representation depicting the motion of said moving object;
   wherein said imaging unit is configured for capturing said reference images according to said motion.

14. The handheld device of claim 13, wherein the resolution of said plurality of initial images is lower than the resolution of said plurality of reference images.

15. The handheld device of claim 13, wherein said handheld device is a cellular phone.

16. A method for creating an image depicting a motion of an object, comprising:
   a) displaying a plurality of images to a user, each said image depicts a scene with a moving object;
   b) cropping at least one sub-image depicting at least said moving object from at least one of said plurality of images according to an instruction received from said user; and
   c) combining said at least one sub-image and at least one of said plurality of images to produce a final representation depicting the motion of said moving object,
   wherein said images are captured by a camera.

17. The method of claim 16, wherein said displaying further comprises presenting to a user an indicator indicative of the motion direction of said moving object.

18. The method of claim 16, wherein each said image having a central area and a peripheral area said displaying further comprises presenting to a user an indicator indicative of the capturing of said moving object in one of said central and peripheral areas.

19. The method of claim 18, wherein said presenting is a member of a group consisting of: displaying an indicator, activating a tactile alarm, and playing an alarming sound.

20. The method of claim 16, wherein said displaying further comprises:
   calculating a distance between said the boundaries of one of said plurality of images depicting said moving object and said moving object, and
   alarming said user if said distance exceeds a predefined distance threshold.

21. The method of claim 20, wherein said alarming is a member of a group consisting of: displaying an indicator, activating a tactile alarm, and playing an alarming sound.

22. The method of claim 16, further comprising identifying said moving object in a plurality of nonoverlapping areas in said plurality of images before b), said cropping being performed according to said plurality of nonoverlapping areas.

23. The method of claim 22, further comprising allowing said user to define said plurality of nonoverlapping areas before b).

24. The method of claim 16, wherein said scene depicts a plurality of moving objects, further comprising allowing said user to select at least one of said plurality of moving objects before b), said cropping comprising cropping at least one sub-image of said at least one of said plurality of moving objects.

25. The method of claim 16, further comprising assembling at least two of said plurality of images to create a panoramic image before said c), said combining comprising combining said at least one sub-image and said panoramic image to produce said final representation.

26. The method of claim 16, wherein said final representation comprises a member of a group comprising: a still image, a sequence in which said motion being animated, a still image animated with said motion.

27. The method of claim 16, wherein said plurality of images are captured using a handheld device which is held by said user.

28. The method of claim 16, wherein said displaying comprises displaying only a portion of said plurality of images to said user, each said portion being selected according to a member selected from a group consisting of: an object motion of said moving object and a camera motion of a camera used for capturing said plurality of images.

29. A handheld device for capturing an image depicting a motion of an object, comprising:
- an imaging unit configured for capturing a plurality of images, each said image depicts a scene;
- a user interface configured for displaying said plurality of images to a user and allowing said user to tag a moving object in said scene;
- a cropping module configured for cropping at least one sub-image depicting at least said moving object from at least one of said plurality of images; and
- a combining module configured for combining said at least one sub-image and at least one of said plurality of images to produce a final representation depicting the motion of said moving object.

30. The handheld device of claim 29, wherein said handheld device is a cellular phone.

* * * * *